Figure 4:
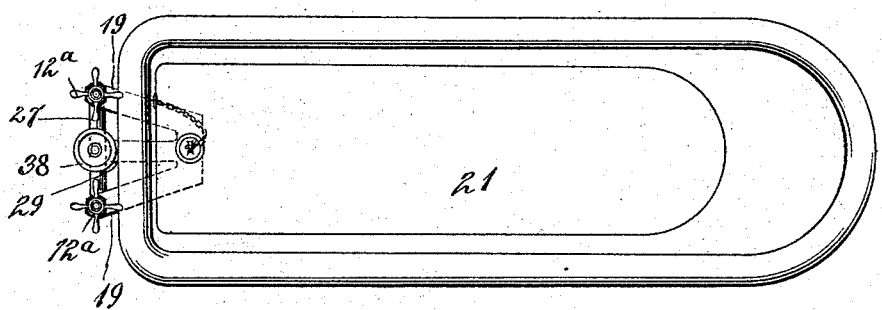

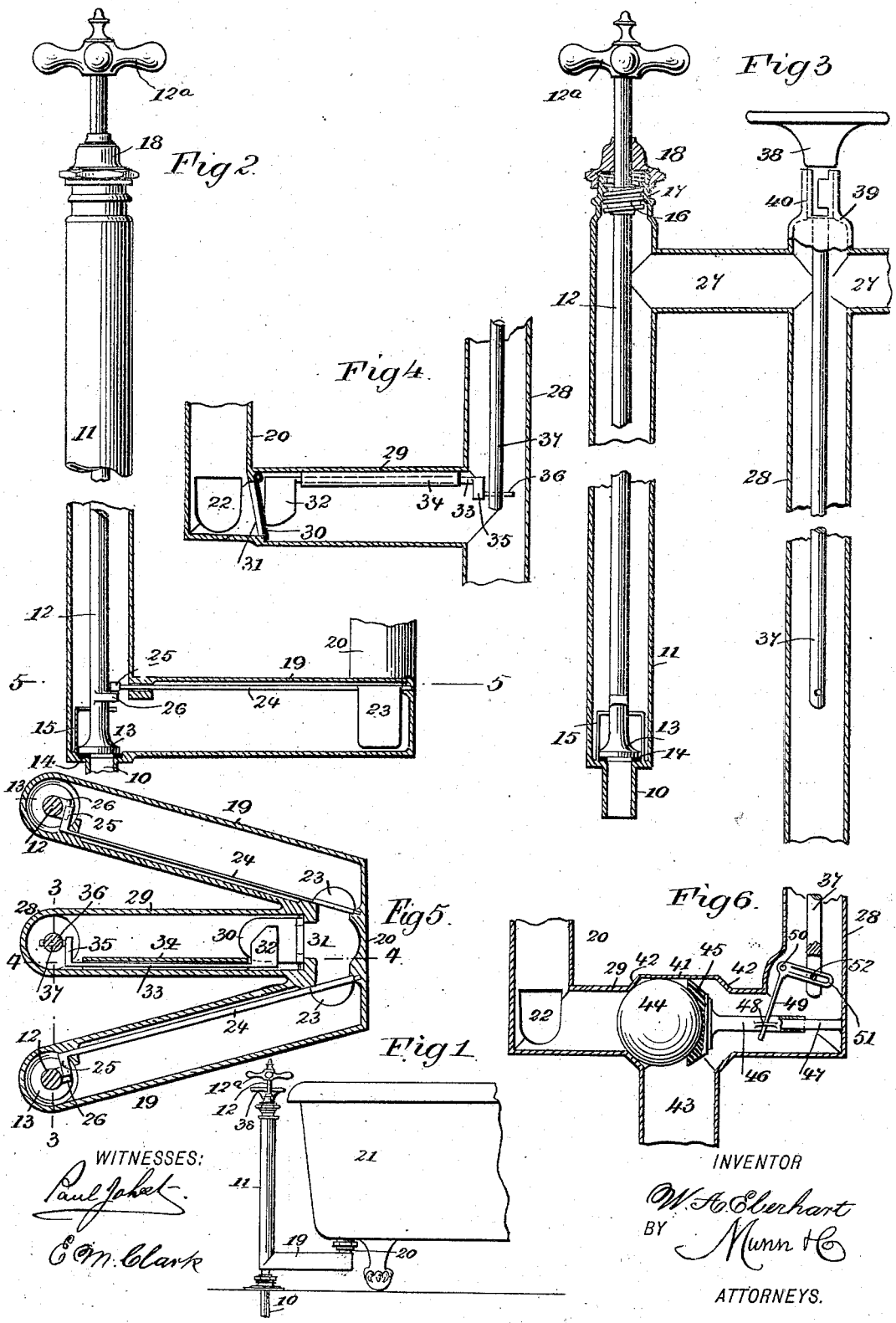

(No Model.) 2 Sheets—Sheet 2.

W. A. EBERHART.
SUPPLY AND WASTE PIPE.

No. 500,871. Patented July 4, 1893.

WITNESSES:
Paul Johst
C. Sedgwick

INVENTOR
W. A. Eberhart
BY Munn & Co
ATTORNEYS.

United States Patent Office.

WILLIAM A. EBERHART, OF ASBURY PARK, NEW JERSEY.

SUPPLY AND WASTE PIPE.

SPECIFICATION forming part of Letters Patent No. 500,871, dated July 4, 1893.

Application filed August 12, 1892. Serial No. 442,876. (No model.)

*To all whom it may concern:*

Be it known that I, WILLIAM A. EBERHART, of Asbury Park, in the county of Monmouth and State of New Jersey, have invented certain new and useful Improvements in Supply and Waste Pipes, of which the following is a full, clear, and exact description.

My invention relates to improvements in the arrangement of hot and cold water supply and waste pipes which are used in connection with various fixtures, such as wash bowls, bath tubs, and the like.

The object of my invention is to produce a simple, sanitary, and convenient arrangement of pipes and valves by which one orifice in a fixture may be used for the inlet, outlet and overflow, and also to construct and arrange the pipes so that no waste water can possibly stand therein, to provide means for positively excluding all waste water from the supply, and to produce a system of pipes which may be very easily controlled and which in general will afford a perfectly clean water supply and perfect drainage.

To these ends my invention consists in certain features of construction and combinations of parts, as will be hereinafter described and claimed.

Reference is to be had to the accompanying drawings forming a part of this specification, in which similar figures of reference indicate corresponding parts in all the views.

Figure 1 is a broken side elevation, showing the pipes connected to a bath tub. Fig. 2 is a broken enlarged detail view, partly in section, showing the arrangement of the supply controlling valves. Fig. 3 is a broken section on the line 3—3 in Fig. 5. Fig. 4 is a broken vertical section on the line 4—4 in Fig. 5, showing in detail the arrangement of the waste controlling valve. Fig. 5 is a sectional plan on the line 5—5 in Fig. 2, of the hot and cold water supply pipes and the waste pipe. Fig. 6 is an enlarged detail sectional view of a modified form of waste controlling valve, and Fig. 7 is a plan view of a bath tub provided with my improved supply and waste pipes.

The water supply pipe 10 is enlarged near the fixture, (which, in the drawings is a bath tub,) as shown at 11, and in the enlarged portion of the pipe is a valve stem 12 which extends through the top of the pipe and terminates in a suitable handle 12ª. The lower end of the stem terminates in a valve 13 which fits against a seat 14 beneath it and is held to move in a limiting guide 15 of the usual kind. The stem 12 is screw threaded near the top, as shown at 16, and this portion is held to turn in a similarly threaded part 17 of the pipe 11, so that the stem may be easily raised and lowered in the usual way. The stem is held to turn in a suitable stuffing box 18.

Opening from the supply pipe near the lower portion of the pipe 11 is a horizontal pipe 19 which connects with a short vertical pipe 20, and the latter enters the bath tub 21, or other fixture. The connection between the horizontal pipe and the pipe 20 is through a passage 22 which is closed by a flap valve 23 which is held to spring in the pipe 19 and extends at right angles from the horizontal rod 24 which is journaled in the pipe 19, the opposite end of said rod terminating in a crank 25 which engages a lug 26 on the stem 12. It will thus be seen that when the stem 12 is raised, the rod 24 will be tilted and the valve 23 opened, and when the stem 12 is lowered the valve 23 is closed.

The overflow from the enlarged portion 11 of the supply pipe is through a cross pipe 27 which connects with the vertical waste pipe 28. There are two of these branch pipes 27 opening from opposite sides of the waste pipe when hot and cold water is used, and it will be understood that while the arrangement of but one water supply pipe is described, two water supply pipes of exactly similar construction may be used, one being for hot water and the other cold, and both are connected with the pipe 20, as described and as shown in Fig. 5.

Leading from the waste pipe 28 is a horizontal pipe 29 which is arranged preferably between the horizontal branch pipes 19, as shown in Fig. 5, and the passage 31 between this pipe and the pipe 20 is closed by a flap valve 30 which swings longitudinally in the pipe 29, as shown in Figs. 4 and 5. The valve 30 may be tightly closed by a plate or crank 32 which is produced on the rod 33, the latter extending longitudinally through the pipe 29 above the valve and being held to turn in a suitable support 34. The rod 33 has at its opposite end a crank 35 which is secured by means of a pin 36 to a spindle or stem 37 which extends upward through a cap 39 at the top of the pipe 28 and terminates in a handle 38. The stem 37 connects with the cap 39 by means of a common form of bayonet joint 40, as shown in Fig. 3, and by this means the stem may be held in either a raised or lowered position.

When the water is to be turned into the fixture or tub 21, the stem 37 is lowered and this action causes the rod 33 to be tilted and the plate or crank 32 depressed, thus closing the valve 30. The water is then turned on through one or both of the supply pipes by raising the stem or stems 12, and when these stems are raised the valves 23 are opened and the water runs in through the passages 22 and up through the pipe 20 to the tub 21. When the tub becomes nearly full the water backs up in the enlarged portions 11 of the pipes 10 and runs off through the pipes 27 and the waste pipe 28, so that there is no danger of the tub overflowing. When the water is to be withdrawn from the tub, the stems 12 are turned down, thus shutting off the supply and closing the valves 23. The stem 37 is then raised and this action tilts the rod 33 and lifts the plate or crank 32, thus freeing the valve 30, the force of the water then causing the valve to swing back and every drop of water is free to run from the fixture or tub.

In Fig. 6 I have shown a preferred form of valve to use instead of the valve 30 and the mechanism for operating it. Here the pipe 29 has a central enlargement 41 with a valve seat 42 at each end, and an extension 43 of the waste pipe leads downward from a point opposite the enlargement 41. A ball valve 44 is held within the enlargement and is adapted to close against one seat 42, while a conoidal clamp 45, which is secured to the valve, is adapted to close against the opposite seat. The clamp 45 is secured to a sleeve 46 and the latter slides on a guide 47 which is secured within the pipe. A keeper 48 on the sleeve 46 is engaged by one arm 49 of a bell crank lever which is pivoted near the bottom of the pipe 28, as shown at 50, and the opposite arm 51 of the bell crank is slotted and receives a pin 52 on the lower end of the stem 37. It will be seen that when the stem is lowered the valve 44 will be tightly closed against one seat 42, thus shutting off all connection with the supply and opening the waste pipe, and when the stem 37 is raised the clamp 45 will be closed against the opposite seat 42, thus closing the waste pipe.

It will be understood that other forms of valves may be used in connection with the pipes without departing from the principle of my invention.

Having thus described my invention, I claim as new and desire to secure by Letters Patent—

1. The combination with the fixture, of a valve-controlled supply pipe, an inlet pipe connecting the supply pipe with the fixture, a waste pipe leading from the inlet pipe, a separate valve for the waste pipe, a valve controlling the connection between the inlet pipe and waste pipe, and means for operating the said valve by the movement of the supply pipe valve stem, substantially as described.

2. The combination with the fixture inlet pipe and the supply pipe, of a branch pipe connecting the supply and inlet pipes, a vertically movable valve stem and valve controlling the supply pipe, a swinging valve arranged in the branch pipe and controlling the entrance to the fixture inlet pipe, and an operative connection between the swinging valve and the vertical movable valve whereby both may be simultaneously operated, substantially as described.

3. The combination with the waste and supply pipes arranged to have a common connection with a fixture, of a branch pipe leading from the waste pipe and connecting with the fixture inlet and supply pipe, an extension pipe leading from the branch pipe, and a valve arranged opposite the mouth of the extension pipe and arranged to close against seats on opposite sides of the mouth so as to close either end portion of the branch pipe, substantially as described.

WILLIAM A. EBERHART.

Witnesses:
　WARREN B. HUTCHINSON,
　C. SEDGWICK.